United States Patent
Park et al.

(10) Patent No.: US 10,397,297 B2
(45) Date of Patent: Aug. 27, 2019

(54) METHOD AND APPARATUS FOR TRANSMITTING AND RECEIVING IMAGE DATA FOR VIRTUAL-REALITY STREAMING SERVICE

(71) Applicant: Samsung Electronics Co., Ltd., Gyeonggi-do (KR)

(72) Inventors: Jung-Shin Park, Seoul (KR); Joo-Hyung Lee, Bucheon-si (KR); Ji-Cheol Lee, Suwon-si (KR); Han-Na Lim, Seongnam-si (KR); Jin-Sung Lee, Seoul (KR); Hyung-Ho Lee, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 114 days.

(21) Appl. No.: 15/568,778

(22) PCT Filed: Mar. 28, 2016

(86) PCT No.: PCT/KR2016/003117
§ 371 (c)(1),
(2) Date: Oct. 23, 2017

(87) PCT Pub. No.: WO2016/171404
PCT Pub. Date: Oct. 27, 2016

(65) Prior Publication Data
US 2018/0091577 A1     Mar. 29, 2018

(30) Foreign Application Priority Data
Apr. 22, 2015   (KR) .................. 10-2015-0056498

(51) Int. Cl.
*G06F 15/173* (2006.01)
*H04L 29/06* (2006.01)
(Continued)

(52) U.S. Cl.
CPC .............. *H04L 65/80* (2013.01); *G06F 3/012* (2013.01); *G06T 3/4092* (2013.01);
(Continued)

(58) Field of Classification Search
CPC ......... H04L 29/06034; H04L 29/06176; H04L 29/06448–29/0651; H04L 29/06523;
(Continued)

(56) References Cited

U.S. PATENT DOCUMENTS

| 6,118,456 A | 9/2000 | Cooper |
| 6,351,261 B1* | 2/2002 | Reichlen .............. G06F 3/011 345/427 |

(Continued)

FOREIGN PATENT DOCUMENTS

| JP | 2013168910 A | 8/2013 |
| KR | 20140035861 A | 3/2014 |
| WO | 2013066062 A1 | 5/2013 |

OTHER PUBLICATIONS

Supplementary European Search Report dated Mar. 29, 2018 in connection with European Patent Application No. 1678 3338.
(Continued)

*Primary Examiner* — Brendan Y Higa

(57) ABSTRACT

The present disclosure relates to a communication technique for converging IoT technology with a 5G communication system for supporting a higher data transmission rate than a 4G system, and a system therefor. The present disclosure may be applied to intelligent services based on 5G communication technology and IoT-related technology (e.g. smart homes, smart buildings, smart cities, smart cars, connected cars, healthcare, digital education, retail business, services related to security and safety, etc.). A method for receiving image data for a virtual-reality streaming service by an electronic device according to an embodiment of the present
(Continued)

invention comprises: a step in which the electronic device determines whether to execute an adaptive virtual-reality streaming service on the basis of a bandwidth state; and a step in which, if it is determined to execute the adaptive virtual-reality streaming service, the electronic device requests and receives, from a server, the image data for the adaptive virtual-reality streaming service on the basis of head-tracking information and bandwidth information collected in advance.

20 Claims, 6 Drawing Sheets

(51) Int. Cl.

| | | |
|---|---|---|
| *H04N 21/236* | (2011.01) | |
| *H04N 21/238* | (2011.01) | |
| *G06T 3/40* | (2006.01) | |
| *H04L 12/26* | (2006.01) | |
| *H04L 29/08* | (2006.01) | |
| *G06F 3/01* | (2006.01) | |
| *H04N 21/218* | (2011.01) | |
| *H04N 21/2343* | (2011.01) | |
| *H04N 21/422* | (2011.01) | |
| *H04N 21/4728* | (2011.01) | |
| *H04N 21/81* | (2011.01) | |
| *H04N 21/845* | (2011.01) | |

(52) U.S. Cl.
CPC .... *H04L 29/06034* (2013.01); *H04L 43/0817* (2013.01); *H04L 43/0894* (2013.01); *H04L 65/601* (2013.01); *H04L 65/604* (2013.01); *H04L 65/607* (2013.01); *H04L 67/22* (2013.01); *H04L 67/38* (2013.01); *H04N 21/21805* (2013.01); *H04N 21/236* (2013.01); *H04N 21/238* (2013.01); *H04N 21/23439* (2013.01); *H04N 21/422* (2013.01); *H04N 21/4728* (2013.01); *H04N 21/816* (2013.01); *H04N 21/8456* (2013.01)

(58) Field of Classification Search
CPC ............... H04L 47/10; H04L 65/00; H04L 65/4069–65/608; H04L 65/80; H04L 67/22; H04L 67/38; H04N 21/2343; H04N 21/236; H04N 21/238; H04N 21/4728; H04N 21/6373; H04N 21/6377; H04N 21/6379; H04N 21/64738; G06F 3/011–3/3015
See application file for complete search history.

(56) References Cited

U.S. PATENT DOCUMENTS

| | | |
|---|---|---|
| 2014/0052846 A1 | 2/2014 | Scherkus et al. |
| 2014/0078043 A1 | 3/2014 | Kim |
| 2014/0232620 A1 | 8/2014 | Fujigaki |
| 2014/0293823 A1 | 10/2014 | Lee et al. |
| 2015/0009132 A1 | 1/2015 | Kuriya et al. |
| 2015/0015671 A1 | 1/2015 | Kellerman et al. |
| 2015/0032823 A1 | 1/2015 | Miller |
| 2015/0215497 A1* | 7/2015 | Zhang ................ H04N 21/4307 348/521 |

OTHER PUBLICATIONS

Mason, W.; "NextVR is Bringing the Best Seat in the House to Your Living Room, Exclusive Interview with DJ Roller"; https://uploadvr.com/nextvr-is-bringing-the-best-seat-in-the-house-to-your-living-room-exclusive-intewiew-with-dj-roller/; Jan. 14, 2015; 4 pages.

* cited by examiner

METHOD AND APPARATUS FOR TRANSMITTING AND RECEIVING IMAGE DATA FOR VIRTUAL-REALITY STREAMING SERVICE

CROSS-REFERENCE TO RELATED APPLICATIONS AND CLAIM OF PRIORITY

This application is a U.S. National Stage application under 35 U.S.C. § 371 of an International application filed on Mar. 28, 2016 and assigned application number PCT/KR2016/003117, which claimed the benefit of a Korean patent application No. 10-2015-0056498 filed on Apr. 22, 2015, the entire disclosures of each of which are hereby incorporated by reference.

TECHNICAL FIELD

The present disclosure relates to a method and apparatus for improving the quality of a virtual reality (VR) streaming service.

BACKGROUND

To satisfy the increasing demands for wireless data traffic since commercialization of $4^{th}$ generation (4G) communication systems, efforts have been made to develop an improved $5^{th}$ generation (5G) communication system or a pre-5G communication system. For this reason, the 5G or pre-5G communication system is referred to as a beyond-4G or post long term evolution (LTE) system.

To achieve high data rates, deployment of the 5G communication system in a millimeter wave (mmWave) band (for example, a 60-GHz band) is under consideration. For the 5G system, beamforming, massive multiple input multiple output (MIMO), full dimensional MIMO (FD-MIMO), array antenna, analog beamforming, and large-scale antenna techniques have been discussed in order to mitigate the path loss and propagation distance of waves.

Further, for network improvement in a system, technologies such as evolved small cell, advanced small cell, cloud radio access network (RAN), ultra-dense network, device-to-device (D2D) communication, wireless backhaul, moving network, cooperative communication, coordinated multipoint (CoMP), and interference cancellation have been developed in the 5G system.

Besides, advanced coding modulation (ACM) techniques such as hybrid FSK and QAM modulation (FQAM) and sliding window superposition coding (SWSC), and advanced access techniques such as filter bank multi carrier (FBMC), non-orthogonal multiple access (NOMA), and sparse code multiple access (SCMA) have been developed in the 5G system.

The Internet is evolving from a human-oriented connection network in which human beings generate and consume information to the Internet of things (IoT) in which information is transmitted/received and processed between distributed elements such as things. The Internet of everything (IoE) technology may be an example in which the IoT is combined with big data processing through connectivity to a cloud server or the like.

For IoT implementation, technologies such as sensing, wired/wireless communication, network infrastructure, service interfacing, and security are required. Recently, techniques including a sensor network for interconnection between things, machine to machine (M2M) communication, and machine type communication (MTC) have been studied.

An intelligent Internet technology (IT) service of creating new values for human livings by collecting and analyzing data generated from interconnected things may be provided in an IoT environment. The IoT may find its applications in a wide range of fields including smart home, smart buildings, smart cities, smart cars or connected cars, smart grids, healthcare, smart appliances, and state-of-the art medical service, through convergence between existing IT technologies and various industries.

In this context, many attempts have been made to apply the 5G system to the IoT. For example, 5G technologies such as sensor network, IoT, and MTC are implemented by techniques such as beamforming, multiple input multiple output (MIMO), and array antenna. The afore-described application of a cloud RAN as a big data processing technology is also an example of convergence between 5G technology and IoT.

Along with large-scale investment of service operators in VR services, it is expected that the VR services will be extended as main future-generation services. In general, VR refers to an almost-real environment or situation created by computer graphics. VR provides an interface which a human feels with his or her sense organs and tricks the human into feeling really interactive. A user may interact with VR by manipulating a device and have nearly real sensational experiences.

Augmented reality (AR), a field of VR, is a computer graphic technique which combines a real environment with a virtual object or information so that the virtual object or information may be seen as it really exists. AR which overlays a virtual object into a real world viewed by a user is also called mixed reality (MR) in the sense that a real world is combined with additional information and a virtual world in real time and viewed as one image.

Further, owing to the proliferation of mobile devices (for example, smartphones and tablet personal computers (PCs)), VR becomes more popular in various services such as education, gaming, navigation, advertisement, or blogs. As wearable devices have recently been commercialized, VR has become a more active research area.

For example, wearable devices are provided in various forms wearable and attachable on a body and clothes, such as a head-mounted type, glasses, a watch, a band, contact lenses, a ring, and clothes. As electronic devices are configured to be wearable as clothes or glasses on a user's body, the wearable devices may increase portability and accessibility.

Although VR was a non-streaming service in its early stage in which VR dedicated content is all downloaded to a VR device and then reproduced, VR has been developed to a service in which VR content is received and reproduced in real time by streaming from a server.

SUMMARY

Since VR content supports a 360-degree omni-view instead of a point of view from which a conventional terminal consumes content, the VR content requires a high-capacity bandwidth about five times larger than that of general video content. As a result, a VR streaming service uses lots of buffering and a large bandwidth, causing interruptions in VR streaming.

An aspect of the present disclosure is to provide a method and apparatus for providing a different quality for each viewing angle based on head tracking information about a user in order to overcome interruptions caused by a bandwidth shortage in a VR streaming service requiring a high-capacity bandwidth.

Another aspect of the present disclosure is to provide a method and apparatus for providing a VR streaming service adaptively according to a current bandwidth state by an electronic device that provides VR services.

In an aspect of the present disclosure, a method for receiving image data for a virtual reality (VR) streaming service in an electronic device includes determining whether to perform an adaptive VR streaming service based on a bandwidth state, and if it is determined to perform the adaptive VR streaming service, requesting image data for the adaptive VR streaming service to a server based on pre-collected head tracking information and bandwidth information, and receiving the image data from the server.

In another aspect of the present disclosure, an apparatus for receiving image data for a VR streaming service includes a decider for determining whether to perform an adaptive VR streaming service based on a bandwidth state in an electronic device, and an executer for, if it is determined to perform the adaptive VR streaming service, requesting image data for the adaptive VR streaming service based on pre-collected head tracking information and bandwidth information.

In another aspect of the present disclosure, a method for transmitting image data for a VR streaming service includes receiving an image data request message for an adaptive VR streaming service from an electronic device, constructing image data for the adaptive VR streaming service based on the image data request message, and transmitting the image data. The image data for the adaptive VR streaming service includes data with high quality corresponding to a resolution equal to or higher than a predetermined value for an area of interest which is a part of a 360-degree image, and the area of interest is determined based on head tracking information and bandwidth information of the electronic device, or event information of the image data.

In another aspect of the present disclosure, an apparatus for transmitting image data for a VR streaming service includes a transceiver for receiving an image data request message for an adaptive VR streaming service from an electronic device, constructing image data for the adaptive VR streaming service based on the image data request message, and transmitting the image data. The image data for the adaptive VR streaming service includes data with high quality corresponding to a resolution equal to or higher than a predetermined value for an area of interest which is a part of a 360-degree image, and the area of interest is determined based on head tracking information and bandwidth information of the electronic device, or event information of the image data.

DETAILED DESCRIPTION

Figure 1:
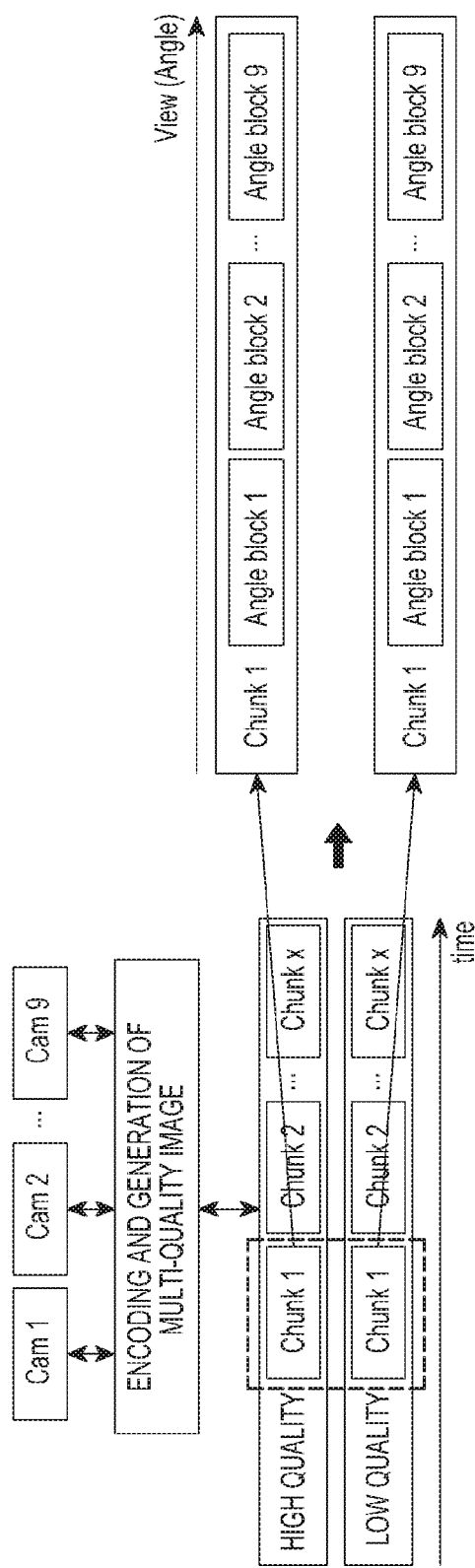
FIG. 1 is a view illustrating exemplary data partitioning according to an embodiment of the present disclosure.

Various embodiments of the present disclosure are described with reference to the accompanying drawings. However, the scope of the present disclosure is not intended to be limited to the particular embodiments and it is to be understood that the present disclosure covers various modifications, equivalents, and/or alternatives. In relation to a description of the drawings, like reference numerals denote the same components.

In the present disclosure, the term 'have', 'may have', 'include', or 'may include' signifies the presence of a specific feature (for example, number, function, operation, or component such as part), not excluding the presence of one or more other features.

In the present disclosure, the term 'A or B', 'at least one of A or/and B', or 'one or more of A or/and B' may cover all possible combinations of enumerated items. For example, 'A or B', 'at least one of A and B', or 'at least one of A or B' may represent all of the cases of (1) inclusion of at least one A, (2) inclusion of at least one B, and (3) inclusion of at least one A and at least one B.

The term as used in the present disclosure, 'first' or 'second' may modify the names of various components irrespective of sequence and/or importance, not limiting the components. These expressions are used to distinguish one component from another component. For example, a first user equipment (UE) and a second UE may indicate different UEs irrespective of sequence or importance. For example, a first component may be referred to as a second component and vice versa without departing the scope of the present disclosure.

When it is said that a component (for example, a first component) is 'operatively or communicatively coupled with/to' or 'connected to' another component (for example, a second component), it should be understood that the one component is connected to the other component directly or through any other component (for example, a third component). On the other hand, when it is said that a component (for example, a first component) is 'directly connected to' or 'directly coupled to' another component (for example, a second component), it may be understood that there is no other component (for example, a third component) between the components.

The term 'configured to' as used herein may be replaced with, for example, the term 'suitable for' 'having the capacity to', 'designed to', 'adapted to', 'made to', or 'capable of' under circumstances. The term 'configured to' may not necessarily mean 'specifically designed to' in hardware. Instead, the term 'configured to' may mean that a device may mean 'capable of' with another device or part. For example, 'a processor configured to execute A, B, and C' may mean a dedicated processor (for example, an embedded processor) for performing the corresponding operations or a generic-purpose processor (for example, a central processing unit (CPU) or an application processor (AP)) for performing the operations.

The terms as used in the present disclosure are provided to describe merely specific embodiments, not intended to limit the scope of other embodiments. It is to be understood that singular forms include plural referents unless the context clearly dictates otherwise. Unless otherwise defined, the terms and words including technical or scientific terms used in the following description and claims may have the same meanings as generally understood by those skilled in the art. The terms as generally defined in dictionaries may be interpreted as having the same or similar meanings as or to contextual meanings of related technology. Unless otherwise defined, the terms should not be interpreted as ideally or excessively formal meanings. When needed, even the terms as defined in the present disclosure may not be interpreted as excluding embodiments of the present disclosure.

According to various embodiments of the present disclosure, an electronic device may be at least one of, for example, a smart phone, a tablet personal computer (PC), a mobile phone, a video phone, an e-Book reader, a desktop PC, a laptop PC, a netbook computer, a workstation, a server, a personal digital assistant (PDA), a portable multimedia player (PMP), an MP3 player, medical equipment, a camera, or an wearable device (for example, smart glasses, a head-mounted device (HMD), electronic clothes, an electronic bracelet, an electronic necklace, an electronic appcessory, an electronic tattoo, a smart mirror, or a smart watch).

According to some embodiments, an electronic device may be a smart appliance. The smart appliance may be at least one of, for example, a television (TV), a digital versatile disk (DVD) player, an audio player, a refrigerator, an air conditioner, a vacuum cleaner, an oven, a microwave oven, a washer, an air purifier, a set-top box, a home automation control panel, a security control panel, a TV box (for example, Samsung HomeSync™, Apple TV™, or Google TV™), a game console (for example, Xbox™ or PlayStation™), an electronic dictionary, an electronic key, a camcorder, or an electronic picture frame.

According to other embodiments, an electronic device may be at least one of a medical device (for example, a portable medical meter such as a blood glucose meter, a heart rate meter, a blood pressure meter, or a body temperature meter, a magnetic resonance angiography (MRA) device, a magnetic resonance imaging (MRI) device, a computed tomography (CT) device, an imaging device, an ultrasonic device, or the like), a navigation device, a global positioning system (GPS) receiver, an event data recorder (EDR), a flight data recorder (FDR), an automotive infotainment device, a naval electronic device (for example, a naval navigation device, a gyrocompass, or the like), an avionic electronic device, a security device, an in-vehicle head unit, an industrial or consumer robot, an automatic teller machine (ATM) in a financial facility, a point of sales (POS) device in a shop, or an Internet of things (IoT) device (for example, a lighting bulb, various sensors, an electricity or gas meter, a sprinkler, a fire alarm, a thermostat, a street lamp, a toaster, sports goods, a hot water tank, a heater, or a boiler).

According to some embodiments, an electronic device may be at least one of furniture, part of a building/structure or a vehicle, an electronic board, an electronic signature receiving device, a projector, and various measuring devices (for example, water, electricity, gas or electro-magnetic wave measuring devices). According to various embodiments, an electronic device may be a combination of two or more of the foregoing devices. According to some embodiments, an electronic device may be a flexible electronic device. According to an embodiment of the present disclosure, an electronic device is not limited to the foregoing devices, and may cover a new electronic device which will emerge along with technology development.

Now, a description will be given of an electronic device according to various embodiments of the present disclosure with reference to the attached drawings. In the present disclosure, the term, user may refer to a person or device (for example, artificial intelligence electronic device) that uses an electronic device.

An embodiment of the present disclosure proposes a method and apparatus for estimating next view angle information based on tracking information, acceleration information, and event information included in an image, which are based on a current point of view of a user of an electronic device that provides a VR service, and providing an image with a different quality for each view based on the estimated information.

In a method for using acceleration information, a subsequent direction of movement of the field of vision of the user and a subsequent viewing angle of the user may be estimated using a current viewing angle and acceleration direction information, and an image in the direction of the field of vision of the user may be provided with high quality. Further, in a method for using event information included in an image, a specific sound or object information in an image may be used. For example, if a sound is heard from behind, the user may naturally turn around in the direction of the sound. In this case, an image of what is behind the user may be provided with high quality. If a new object appears in the image at some time point, the user naturally directs his or her eyes in the direction from which the new object appears or moves. Then, an image of a corresponding field of vision may be provided with high quality. The event-based estimation method is also applicable to local VR content downloading and then selective rendering as well as streaming.

According to an embodiment of the present disclosure, a VR service-enabled electronic device may provide an adaptive VR streaming service according to a current bandwidth state. Adaptive VR streaming provides an image with various qualities based on acceleration information, location information, bandwidth information, and so on. For example, a part which the user views with a high probability, including a current viewing angle of the user, may be transmitted with high quality, whereas a part that the user views with a low probability may be transmitted with medium or low quality. Alternatively or additionally, only an image at a viewing angle within a movable range from the current viewing angle of the user may be transmitted, whereas an image at a viewing angle outside the movable range may not be transmitted.

To determine whether to perform adaptive VR streaming according to an embodiment of the present disclosure, a buffer level of an electronic device may be used, and/or a bandwidth may be used. These methods may be used independently or in combination.

In the method for using a buffer level, a bandwidth state is estimated based on the buffer level of the electronic device. That is, if the buffer level is high, a bandwidth is estimated to be large, and thus an entire image may be transmitted with high quality. On the other hand, if the buffer level is low, the bandwidth is estimated to be small, and thus an image at a viewing angle expected to be used less may be transmitted with low quality. For example, in the case where three buffer levels, high, medium, and low are defined, if the current buffer level is high, an entire 360-degree image may be transmitted with high quality. If the current buffer level is medium, an image at a subsequent expected viewing angle (hereafter, referred to as an area of interest) including a current viewing angle may be transmitted with high quality, and an image of an area (hereinafter, referred to as an uninterested area) other than the area of interest may be transmitted with medium quality. If the current buffer level is low, the image of the area of interest may be transmitted with high quality, and the image of the uninterested area may be transmitted with low quality.

In the bandwidth measurement method, an average bandwidth may be measured on a chunk basis. If the measurement value (chunk size/chunk download time) is smaller than a bandwidth required to provide a high-quality image for every viewing angle, an image of an uninterested area may be transmitted with medium or low quality.

Now, a description will be given of a method for providing an adaptive VR streaming service according to an embodiment of the present disclosure.

Two methods for providing an adaptive VR streaming service according to an embodiment of the present disclosure are largely available depending on whether one image can be encoded at a plurality of coding rates.

If it is not possible to encode one image at a plurality of coding rates in a server, the server may manage 360-degree images by view or by coding rate, or construct or transmit image data based on a request of an electronic device. For this purpose, the server encodes an image captured through a 360-degree camera with multiple qualities, primarily segments the encoded multi-quality image into chunks, secondarily segments each chunk into angle blocks according to respective angles or views, and stores the angle blocks in a storage.

FIG. 1 illustrates exemplary data partitioning according to an embodiment of the present disclosure. While an image is captured through 9 cameras, cam 1 to cam 9 and each chunk is segmented into 9 angle blocks in FIG. 1, by way of example, the number of cameras and the number of angle blocks per chunk may be changed. Further, while encoding is performed at two quality levels, that is, high and low in FIG. 1 by way of example, three or more image qualities may be defined.

A chunk may be segmented into angle blocks at symmetrical or asymmetrical angles.

Symmetrical-angle segmentation refers to, for example, segmentation of 360 degrees by 45, thus producing 8 angle blocks or by 30, thus producing 12 angle blocks. In asymmetrical-angle segmentation, for example, a part which a user views with a low probability may be segmented into relatively small angle blocks and a part which a user views with a high probability may be segmented into relatively large angle blocks, or a part with a large motion may be segmented into relatively large angle blocks and a part with a small motion may be segmented into relatively small angle blocks. Further, the size of every angle block may be different so that the size of an angle block may be proportional to a viewing probability. Further, the sizes or resolution levels of angle blocks may be different according to the characteristics of an image such as a sport image, a movie, or a nature image. For example, in the case of a fast-motion image such as a sport image, a screen is rendered to be seamless.

Meanwhile, the electronic device may request a VR streaming service to the server adaptively according to its capabilities or a current network state. For this purpose, the electronic device transmits a chunk index and chunk quality information for each chunk to the server, and the server transmits a chunk corresponding to the transmitted information. Further, to request a chunk in angle blocks according to an embodiment of the present disclosure, when requesting an image to the server, the electronic device should transmit information about an angle block along with a chunk index and chunk quality information.

According to an embodiment of the present disclosure, if an image with different qualities for respective views is provided, the electronic device should receive image data divided on a view basis from the server and aggregate the image data. Or the server may generate a 360-degree image by aggregating per-view divided images, and then transmit the 360-degree image to the electronic device. Or the server and the electronic device may negotiate UE capabilities for image processing during connection setup between the server and the electronic device, and an image aggregation entity may be determined based on the result of the negotiation. For example, if the image processing capabilities of the electronic device are low, the method for providing an aggregated image to an electronic device by a server may be selected.

Meanwhile, if an area of interest and an uninterested area can be encoded by different compressions as in a smart codec scheme, the electronic device may transmit information about an area of interest that the user will view to the server based on a buffer level and head tracking information, and the server may transmit an image of the area of interest with high quality at a low compression rate, and an image of the uninterested area with low quality at a high compression rate, thereby reducing a data size. A specific object or area may be set as the area of interest by the user's direct block configuration, according to the buffer level of the electronic device, or an automatic focusing setting in a camera connected to the electronic device.

Figure 2:
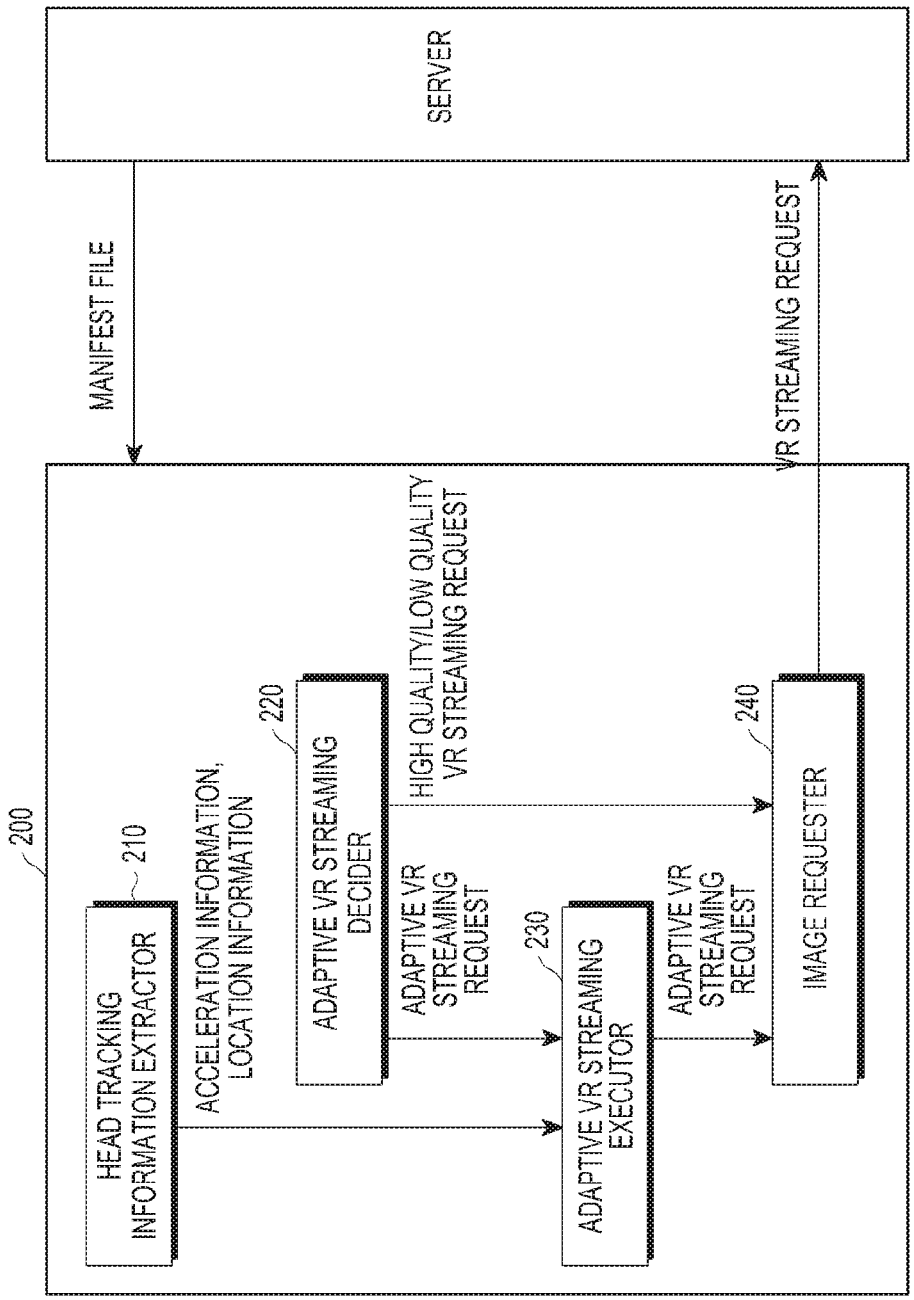
FIG. 2 is a view illustrating a configuration of an electronic device for providing an adaptive virtual reality (VR) streaming service according to an embodiment of the present disclosure.

FIG. 2 illustrates a configuration of an electronic device for providing an adaptive VR streaming service according to an embodiment of the present disclosure.

Referring to FIG. 2, an electronic device 200 according to an embodiment of the present disclosure may include a head tracking information extractor 210, an adaptive VR streaming decider 220, an adaptive VR streaming executer 230, and an image requester 240.

The head tracking information extractor 210 extracts acceleration information and location information based on information received from a sensor that senses a motion such as a gyro sensor or an accelerometer sensor, or a camera in the electronic device.

The adaptive VR streaming decider 220 determines whether to perform adaptive VR streaming according to a bandwidth state. Specifically, if a bandwidth measured by the electronic device is larger than a bandwidth required to provide an entire 360-degree image with high quality, the whole image may be received with high quality, and thus the adaptive VR streaming decider 220 determines not to perform adaptive VR streaming. If the measured bandwidth is smaller than the required bandwidth, the entire image may be received with low quality. Thus, the adaptive VR streaming decider 220 determines not to perform adaptive VR streaming. Then, the adaptive VR streaming decider 220 provides a determination result to the VR streaming executer 230 and the image requester 240.

The adaptive VR streaming executer 230 receives the extracted acceleration information and location information from the head tracking information extractor 210. If the adaptive VR streaming decider 220 determines to perform adaptive VR streaming, the adaptive VR streaming executer 230 determines chunk information to be requested to the server based on the acceleration information and the location information.

The image requester 240 requests adaptive VR streaming to the server according to the determinations made by the adaptive VR streaming decider 220 and the adaptive VR streaming executer 230. Herein, the image requester 240 acquires supported quality information and angle block index information based on a manifest file pre-received from the server, generates a request message based on the acquired information, and transmits the request message to the server. As mentioned before, the request message may include a chunk index, quality information, and an angle block index.

Now, a description will be given of a method for providing different qualities according to an embodiment of the present disclosure.

For a neighboring part that a user will view with a high probability with respect to a current point of view, a high-quality image may be requested, and for the remaining part, a low-quality image may be requested. Depending on how location information and acceleration information are used, the following two methods are available.

If only location information is used, high quality may be requested for views to the left and right of a current view of the user.

If both location information and acceleration information are used, it is determined that the user is highly probable to direct his or her eyes to a view in an acceleration direction, and thus a high-quality image may be requested for the current view and an area in the acceleration direction.

Figure 3:
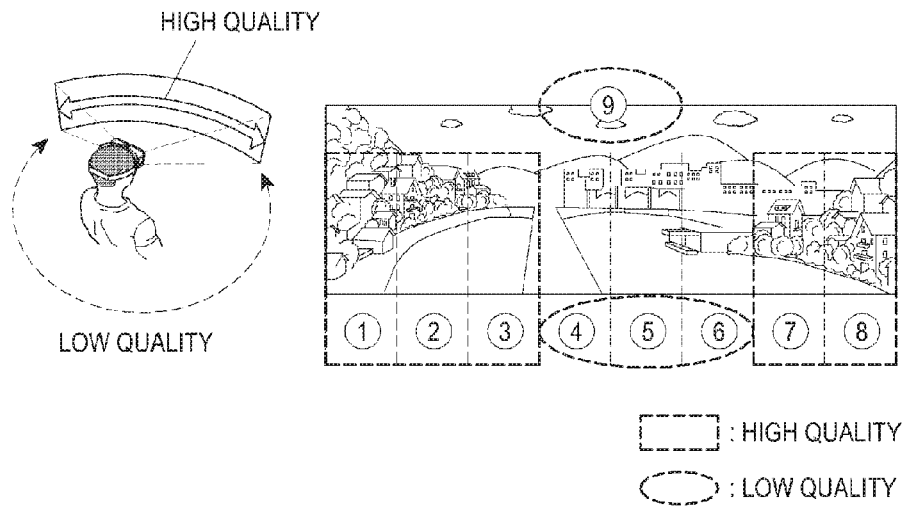
FIG. 3 is a view illustrating an example of requesting an image having different qualities in consideration of only location information in a method for providing an adaptive VR streaming service according to an embodiment of the present disclosure.
Figure 4:
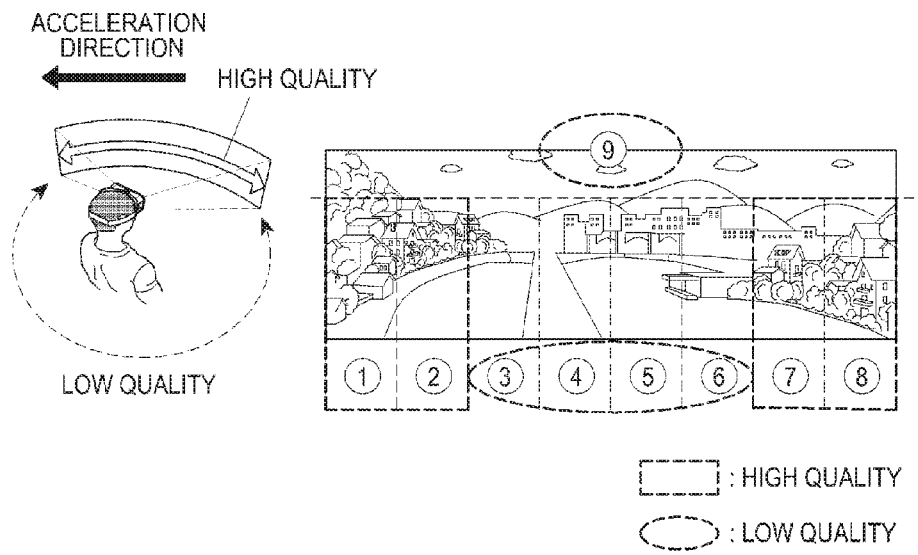
FIG. 4 is a view illustrating an example of requesting an image having different qualities in consideration of both location information and acceleration information in a method for providing an adaptive VR streaming service according to an embodiment of the present disclosure.

FIG. 3 is a view illustrating an example of requesting an image having different qualities in consideration of only location information, and FIG. 4 is a view illustrating an example of requesting an image having different qualities in consideration of both location information and acceleration information.

Referring to FIG. 3, if a user is viewing ⑤, high quality may be requested for images of ⑤, ④ and ⑥ near to ⑤, and a ceiling ⑨, whereas low quality may be requested for images of the other views ①, ②, ③, ⑦, and ⑧.

Referring to FIG. 4, if a user is viewing ⑤ and acceleration information exists to the left, high quality may be requested for images of ⑤, ④ and ⑥ near to ⑤, ③ near to ⑤ in an acceleration direction, and a ceiling ⑨, whereas low quality may be requested for images of the other views ①, ②, ⑦, and ⑧.

While two image quality levels, high and low are defined in FIGS. 3 and 4, three or more image quality levels may be defined. In FIG. 3, for example, high quality may be requested for images of ④, ⑤, ⑥, and ⑨, medium quality may be requested for ③ and ⑦ relatively near to the current view among the remaining views, and low quality may be requested for images of the views ①, ②, and ⑧ relatively far from the current view. In FIG. 4, high quality may be requested for images of ③ to ⑥, and ⑨, medium quality may be requested for ① and ② in the acceleration direction, and low quality may be requested for images of the views ⑦ and ⑧ opposite to the acceleration direction.

As described before, even when subsequent viewing angle information about the user is estimated using event information included in an image, an image with two or more different qualities for respective views may also be provided based on the estimated information.

Then, only an image of a part which the user will view with high probability with respect to the current view may be selectively requested, while an image of the remaining part may not be requested. As a result, a bandwidth may be reduced. Like the afore-described methods for requesting an image having different qualities, an image may be selectively requested in the following two methods depending on how location information and acceleration information are used.

In the case where only location information is used, only an image of views to the left and right of the current view of the user may be requested, while an image of the remaining part may not be requested.

In the case where both location information and acceleration information are used, only an image of the current view and an area in an acceleration direction may be requested, while an image of the remaining part may not be requested, determining that the user will move the eyes to a view in the acceleration direction.

Figure 5:
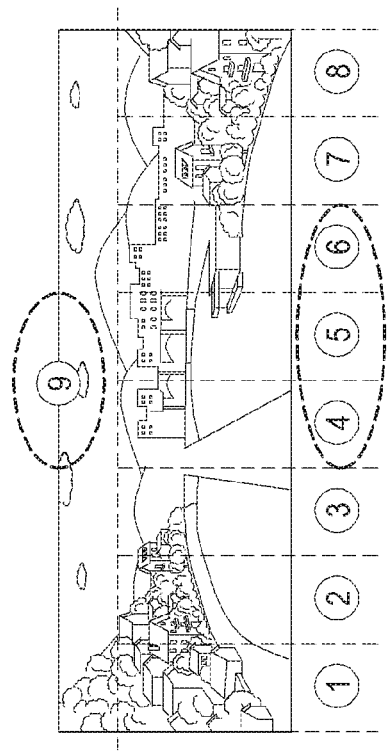
FIG. 5 is a view illustrating an example of selectively requesting an image in consideration of only location information in a method for providing an adaptive VR streaming service according to an embodiment of the present disclosure.
Figure 5:
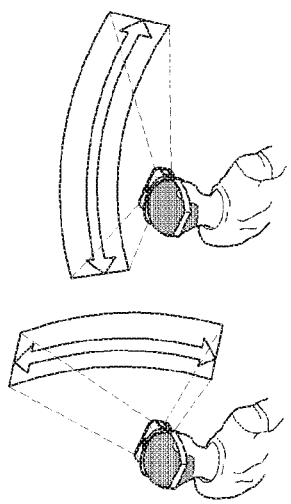
Figure 6:
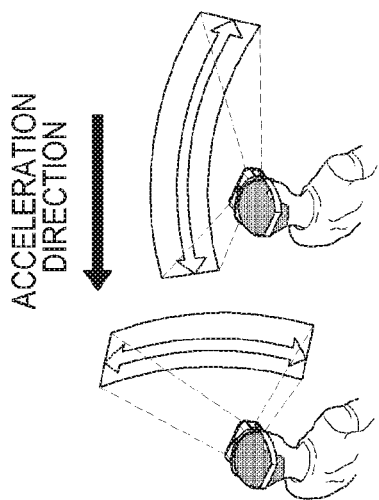
FIG. 6 is a view illustrating an example of selectively requesting an image in consideration of both location information and acceleration information in a method for providing an adaptive VR streaming service according to an embodiment of the present disclosure.
Figure 6:
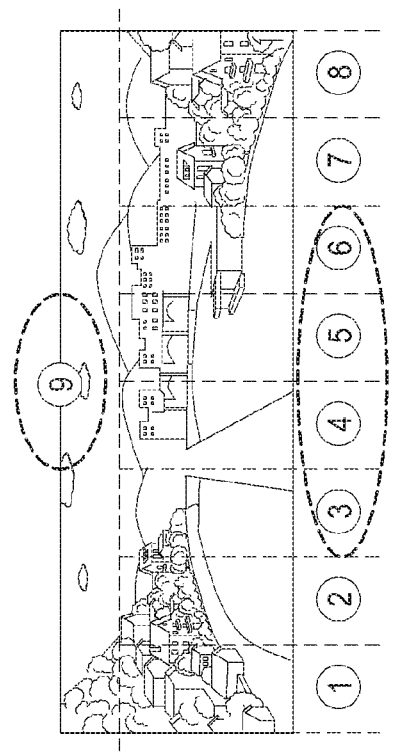

FIG. 5 is a view illustrating an example of selectively requesting an image in consideration of only location information, and FIG. 6 is a view illustrating an example of selectively requesting an image in consideration of both location information and acceleration information.

Referring to FIG. 5, if a user is viewing ⑤, an image of ⑤, ④ and ⑥ near to ⑤, and a ceiling ⑨ may be requested, whereas images of the other views ①, ②, ③, ⑦, and ⑧ may not be requested.

Referring to FIG. 6, if a user is viewing ⑤ and acceleration information exists to the left, images of ⑤, ④ and ⑥ near to ⑤, ③ near to ⑤ in an acceleration direction, and a ceiling ⑨ may be requested, whereas images of the other views ①, ②, ⑦, and ⑧ may not be requested.

Further, as described before, even when subsequent viewing angle information of a user is estimated using event information included in an image, an image for each view may be selectively provided based on the estimated information.

Figure 7:
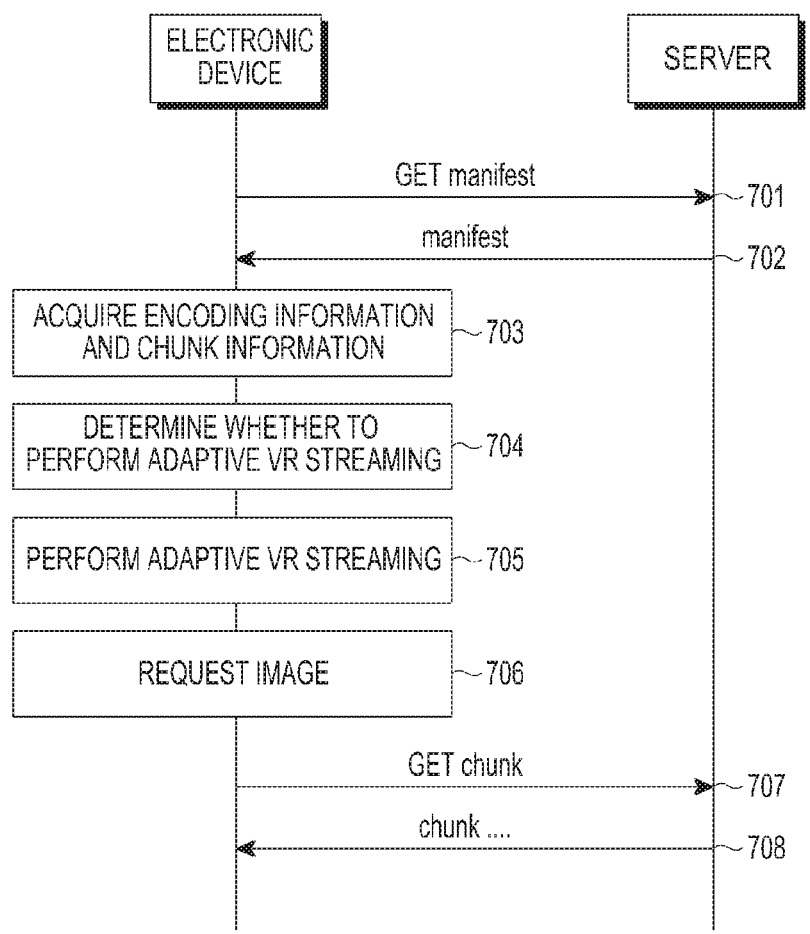
FIG. 7 is a flowchart illustrating a procedure for providing an adaptive VR streaming service according to an embodiment of the present disclosure.

FIG. 7 is a flowchart illustrating a procedure for providing an adaptive VR streaming service according to an embodiment of the present disclosure.

Referring to FIG. 7, an electronic device requests a manifest file to a server and receives the manifest file from the server in operations 701 and 702. In operation 703, the electronic device acquires encoding and chunk information. Herein, the electronic device may transmit information about its capabilities including a decoding capability to the server. The electronic device measures a current bandwidth and determines whether to perform adaptive VR streaming based on the measured bandwidth in operation 704. That is, if the measured bandwidth is larger than a bandwidth required to provide an entire 360-degree image with high quality, the electronic device may receive the entire image with high quality and thus determines not to perform adaptive VR streaming. If the measured bandwidth is less than the bandwidth required for high quality, the electronic device determines to perform adaptive VR streaming. If the measured bandwidth is less than a bandwidth required to provide an entire 360-degree image with low quality, the electronic device will receive the entire image with low quality, and thus determines not to perform adaptive VR streaming. If the electronic device determines to perform adaptive VR streaming, the electronic device determines chunk information to be requested to the server based on acceleration information and location information which are head tracking information pre-received from a motion sensor, a camera, and so one equipped in the electronic device in operation 705. In operation 706, the electronic device requests adaptive VR streaming to the server based on the determination. Herein, the electronic device acquires supported quality information and angle block index information based on the manifest file previously received from the server, generates a request message based on the acquired information, and transmits the request message to the server in operation 708. The request message may include a chunk index, quality information, and an angle block index. In operation 708, the electronic device receives a chunk from the server according to the request. Herein, the server may transmit an image within a decodable range based on the UE's capability information received in operation 701.

The term "module" as used herein may refer to a unit including one or a combination of two or more of hardware, software, and firmware. The term "module" may be used interchangeably with terms such as, for example, unit, logic, logical block, component, or circuit. A "module" may be the smallest unit of an integrated part or a portion thereof. A "module" may be implemented mechanically, or electronically. For example, a "module" may include at least one of a known, or to-be-developed, application-specific integrated circuit (ASIC) chip, field-programmable gate array (FPGA) or programmable logic device that perform certain operations.

At least a part of devices (for example, modules or their functions) or methods (for example, operations) according to various embodiments of the present disclosure may be implemented as commands stored in a computer-readable storage medium in the form of a programming module. When the commands are executed by a processor (for example, the processor 120, the one or more processors may execute functions corresponding to the commands. The computer-readable medium may be, for example, the memory 130.

The computer-readable medium may include hard disk, floppy disk, magnetic media (for example, magnetic tape), optical media (for example, compact disc read-only memory (CD-ROM)), digital versatile disc (DVD), magneto-optical media (for example, floptical disk), hardware devices (for example, read-only memory (ROM), random access memory (RAM) or flash memory)), and the like. Program instructions may include machine language code that are produced by a compiler or high-level language code that may be executed by a computer using an interpreter. The above-described hardware device may be configured to operate as one or more software modules to perform operations according to various embodiments, and vice versa.

A module or a programming module according to various embodiments may include one or more of the above-described components, may omit a portion thereof, or may include additional components. Operations that are performed by a module, a programming module or other components according to the present disclosure may be processed in a serial, parallel, repetitive or heuristic manner. Also, some operations may be performed in a different order or omitted, or additional operations may be added.

According to various embodiments of the present disclosure, a storage medium may store instructions configured to, when executed by at least one processor, control the at least one processor to perform at least one operation. The at least one operation may include executing a VR mode in an electronic device, sensing an interrupt according to generation of at least one event, changing event-related information related to the generated event to a form corresponding to the VR mode, and displaying the changed event-related information on a screen executed in correspondence with the VR mode.

The embodiments disclosed in the present specification are provided for description and understanding of the present disclosure, not limiting the scope of the present disclosure. Accordingly, the scope of the present disclosure should be interpreted as embracing all modifications or various embodiments within the scope of the present disclosure therein.

The invention claimed is:

1. An apparatus for receiving image data for a virtual reality (VR) streaming service, the apparatus comprising:
a transceiver; and
a processor configured to:
determine whether to perform an adaptive VR streaming service based on a bandwidth state; and
if it is determined to perform the adaptive VR streaming service, request image data for the adaptive VR streaming service based on pre-collected head tracking information and bandwidth information.

2. The apparatus of claim 1, wherein if it is determined that it is difficult to receive all of the image data with a high quality corresponding to a resolution equal to or higher than a predetermined value according to the bandwidth state, it is determined to perform the VR streaming service.

3. The apparatus of claim 1, wherein the bandwidth state is estimated based on information about a buffer level of the apparatus.

4. The apparatus of claim 1, wherein an average bandwidth is measured on a chunk basis, and if it is determined that it is difficult to receive all of the image data with a high quality corresponding to a resolution equal to or higher than a predetermined value according to the measured average bandwidth, it is determined to perform the VR streaming service.

5. The apparatus of claim 1, wherein a position to which eyes of a user is expected to move subsequently based on acceleration information included in the tracking information is set as an area of interest, and image data with a high quality corresponding to a resolution equal to or higher than a predetermined value is requested for the area of interest.

6. The apparatus of claim 5, wherein image data with a resolution lower than a resolution equal to or lower than the predetermined value is requested for an area other than the area of interest.

7. The apparatus of claim 5, wherein image data is not requested for an area other than the area of interest.

8. The apparatus of claim 1, wherein image data with a high quality corresponding to a resolution equal to or higher than a predetermined value is requested for an area of interest set based on event information included in the image data, and received.

9. The apparatus of claim 8, wherein the event information includes direction information about a sound heard or an object appearing at a specific time point.

10. The apparatus of claim 1, wherein chunk index information for the requested image data, an angle block index for an angle block divided from the image data according to a viewing angle, and resolution information are transmitted to a server based on encoding information and chunk information acquired from the server.

11. A method for receiving image data for a virtual reality (VR) streaming service in an electronic device, the method comprising:
   determining whether to perform an adaptive VR streaming service based on a bandwidth state; and
   if it is determined to perform the adaptive VR streaming service, requesting image data for the adaptive VR streaming service to a server based on pre-collected head tracking information and bandwidth information, and receiving the image data from the server.

12. The method of claim 11, wherein if it is determined that it is difficult to receive all of the image data with a high quality corresponding to a resolution equal to or higher than a predetermined value according to the bandwidth state, it is determined to perform the VR streaming service.

13. The method of claim 11, wherein the bandwidth state is estimated based on information about a buffer level of the electronic device.

14. The method of claim 11, wherein an average bandwidth is measured on a chunk basis, and if it is determined that it is difficult to receive all of the image data with a high quality corresponding to a resolution equal to or higher than a predetermined value according to the measured average bandwidth, it is determined to perform the VR streaming service.

15. The method of claim 11, wherein a position to which eyes of a user is expected to move subsequently based on acceleration information included in the tracking information is set as an area of interest, and image data with a high quality corresponding to a resolution equal to or higher than a predetermined value is requested for the area of interest.

16. The method of claim 15, wherein image data with a resolution lower than a resolution equal to or lower than the predetermined value is requested for an area other than the area of interest.

17. The method of claim 15, wherein image data is not requested for an area other than the area of interest.

18. The method of claim 11, wherein image data with a high quality corresponding to a resolution equal to or higher than a predetermined value is requested for an area of interest set based on event information included in the image data, and received.

19. The method of claim 18, wherein the event information includes direction information about a sound heard or an object appearing at a specific time point.

20. An apparatus for transmitting image data for a virtual reality (VR) streaming service, the apparatus comprising:
   a transceiver; and
   a processor configured to:
      control the transceiver to receive an image data request message for an adaptive VR streaming service from an electronic device,
      construct image data for the adaptive VR streaming service based on the image data request message, and
      transmit the image data,
   wherein the image data for the adaptive VR streaming service includes data with high quality corresponding to a resolution equal to or higher than a predetermined value for an area of interest which is a part of a 360-degree image, and
   wherein the area of interest is determined based on head tracking information and bandwidth information of the electronic device, or event information of the image data.

* * * * *